United States Patent [19]
Goodrich

[11] Patent Number: 6,160,887
[45] Date of Patent: Dec. 12, 2000

[54] TELEPHONE LOOP-CURRENT REGULATOR

[76] Inventor: Patrick Goodrich, 14617 N. 8th Way, Phoenix, Ariz. 85022

[21] Appl. No.: 08/850,607

[22] Filed: May 2, 1997

[51] Int. Cl.[7] .............................. H04M 9/00; H02H 3/22
[52] U.S. Cl. ........................................... 379/412; 361/119
[58] Field of Search .................................... 379/412, 413, 379/324, 379, 378, 377, 399, 385; 361/119, 118; 315/133, 134

[56] References Cited

U.S. PATENT DOCUMENTS

| | | | |
|---|---|---|---|
| 4,465,903 | 8/1984 | Barber | 379/412 |
| 4,476,351 | 10/1984 | Beegle et al. | 379/324 |
| 4,484,105 | 11/1984 | Kriete et al. | 315/133 |
| 4,567,329 | 1/1986 | Bailly et al. | 379/379 |
| 4,580,011 | 4/1986 | Glaser | 379/418 |
| 4,727,571 | 2/1988 | Brandstetter et al. | 379/412 |
| 4,852,152 | 7/1989 | Honick | 379/93.05 |
| 4,876,620 | 10/1989 | Borkowicz | 379/412 |
| 5,020,100 | 5/1991 | Gardiner | 379/377 |
| 5,146,384 | 9/1992 | Markovic et al. | 361/55 |
| 5,281,792 | 1/1994 | Lee et al. | 219/209 |
| 5,333,196 | 7/1994 | Jakab | 379/412 |
| 5,539,820 | 7/1996 | Pistilli | 379/412 |
| 5,602,914 | 2/1997 | Andreini et al. | 379/422 |
| 5,668,866 | 9/1997 | Eriksson | 379/412 |

*Primary Examiner*—Forester W. Isen
*Assistant Examiner*—Brian Tyrone Pendleton
*Attorney, Agent, or Firm*—Paul W. Davis; Jeffrey D. Moy; Weiss & Moy, P.C.

[57] ABSTRACT

A loop-current regulator for protecting terminal telephone equipment coupled to telephone lines from high telephone line loop-current. The loop-current regulator has a current regulator for protecting the terminal telephone equipment from excess power generated by current signals which pass through the telephone lines to the terminal telephone equipment. A signal network circuit is coupled to the current regulator for providing an alternating current (AC) path for AC signals to pass by the current regulator while minimizing attenuation of the AC signals. A bridge rectifier circuit is coupled to the current regulator, the signal network circuit, and the telephone lines for allowing the current signals to pass in only a single direction through the current regulator and the signal network circuit regardless of the polarity of the telephone lines. A surge protection circuit is coupled to the bridge rectifier circuit and to the telephone lines for protecting the terminal telephone equipment form line-to-line surges.

19 Claims, 2 Drawing Sheets

LOOP CURRENT ATTENUATOR

TELEPHONE LOOP-CURRENT REGULATOR

BACKGROUND OF THE INVENTION

1. Field of the Invention

This invention relates generally to current regulators and, more specifically, to a telephone loop-current regulator which plugs into a standard telephone jack ahead of any terminal telephone equipment and which protects the terminal telephone equipment from high telephone-line loop-current and the damage or dysfunction that the heat produced from the excess power may cause the terminal telephone equipment.

2. Description of the Prior Art

As shown in FIG. 1, originally, telephone line current was limited only by the resistance on the telephone wires or "loop resistance". Because of Federal Communications Commission (FCC) and Bell Telephone Systems specifications for off-hook current load for terminal telephone equipment, the power generated in any piece of terminal telephone equipment may reach nearly two (2) watts. This amount of wattage is too much for most pieces of terminal telephone equipment to handle. This is especially true for newer solid-state terminal telephone equipment pieces such as Personal Computer (PC) cards and Personal Computer Memory Card International Association (PCMCIA) modems which are more likely to be susceptible to damage due to excessive power.

Recently, loop-current attenuators, FIG. 2, have been designed to limit telephone line current. Loop-current attenuators are devices which are manually adjusted to control the telephone line current using a selection of resistors and capacitors. While loop-current attenuators do work, there are several problems associated with them. First, loop-current attenuators must be adjusted when they are installed. This requires special testing equipment and technical training. Second, loop-current attenuators must remain in a fixed location or be constantly readjusted. They must also be readjusted if the terminal telephone equipment is changed which could occur anytime a user plugs in or unplugs a telephone or other terminal telephone device into the telephone jack. This severely limits the use of loop-current attenuators. However, the main problem with loop-current attenuators is the fact that no loop-current attenuator complies to FCC Regulations, Part 68, Section 68.314(c) (2) which limits the decrease in loop-current to no more than twenty-five percent (25%) from its peak during the first five seconds after the terminal telephone equipment goes off-hook. This is due to the capacitors which loop-current attenuators use to pass AC signals.

Therefore, a need existed to provide a portable loop-current regulator. The loop-current regulator must be easy to installed. The loop-current regulator must not require a user to have special testing equipment or technical training when installing the loop-current regulator. The loop-current regulator must not require the user to constantly readjust the loop-current regulator. The loop-current regulator must also comply to FCC Regulations, Part 68, Section 68.314(c)(2) which limits the decrease in loop-current to no more than twenty-five percent (25%) from its peak during the first five seconds after the terminal telephone equipment goes off-hook.

SUMMARY OF THE INVENTION

In accordance with one embodiment of the present invention, it is an object of the present invention to provide a loop-current regulator.

It is another object of the present invention to provide a loop-current regulator that is highly portable.

It is another object of the present invention to provide a loop-current regulator that is easy to install and reinstall.

It is still another object of the present invention to provide a loop-current regulator that is easy to install and reinstall that does not require a user to have special testing equipment or technical training when installing or reinstalling the loop-current regulator.

It is still another object of the present invention to provide a loop-current regulator that does not require constant adjusting or readjusting in order to properly function.

It is yet another object of the present invention to provide a loop-current regulator that complies to FCC Regulations, Part 68, Section 68.314(c) (2) which limits the decrease in loop-current to no more than twenty-five percent (25%) from its peak during the first five seconds after the terminal telephone equipment goes off-hook.

BRIEF DESCRIPTION OF THE PREFERRED EMBODIMENTS

In accordance with one embodiment of the present invention, a loop-current regulator system for protecting terminal telephone equipment coupled to telephone lines from high telephone line loop-current. The loop-current regulator system uses a current regulator for protecting the terminal telephone equipment from excess power generated by current signals which pass through the telephone lines to the terminal telephone equipment. A signal network circuit is coupled to the current regulator for providing an alternating current (AC) path for AC signals to pass by the current regulator while minimizing attenuation of the AC signals. A bridge rectifier circuit is coupled to the current regulator, the signal network circuit, and the telephone lines for allowing the current signals to pass in only a single direction through the current regulator and the signal network circuit regardless of the polarity of the telephone lines. A surge protection circuit is coupled to the bridge rectifier circuit and to the telephone lines for protecting the terminal telephone equipment form line-to-line surges.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
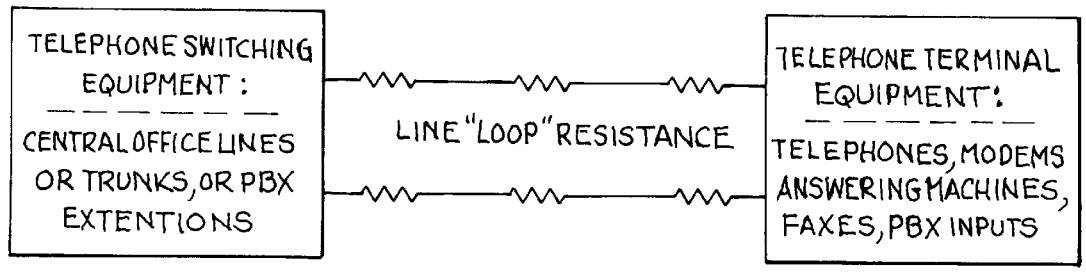
FIG. 1 shows a simplified electrical schematic of a prior art approach to limiting telephone line current.
Figure 2:
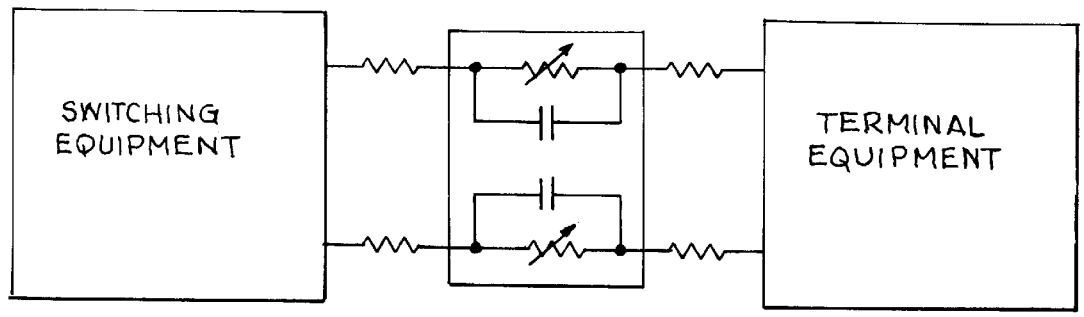
FIG. 2 shows a simplified electrical schematic of another prior art approach to limiting telephone line current.
Figure 3:
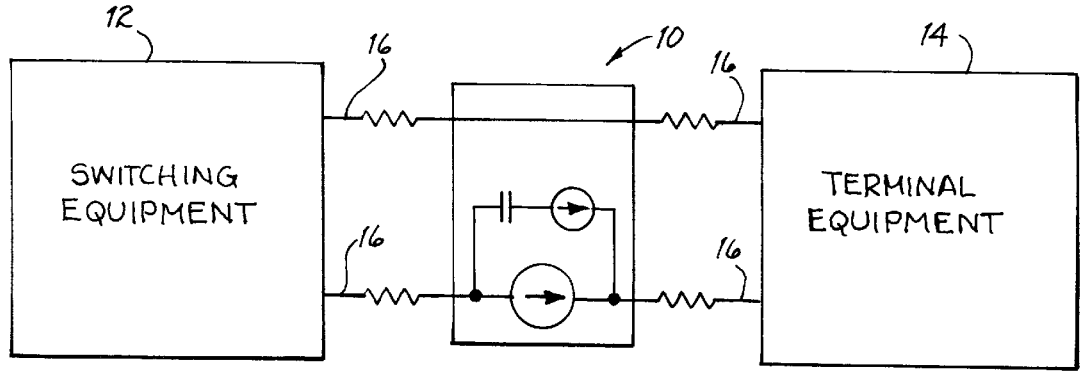
FIG. 3 shows a simplified functional block diagram of the telephone loop-current regulator of the present invention.
Figure 4:
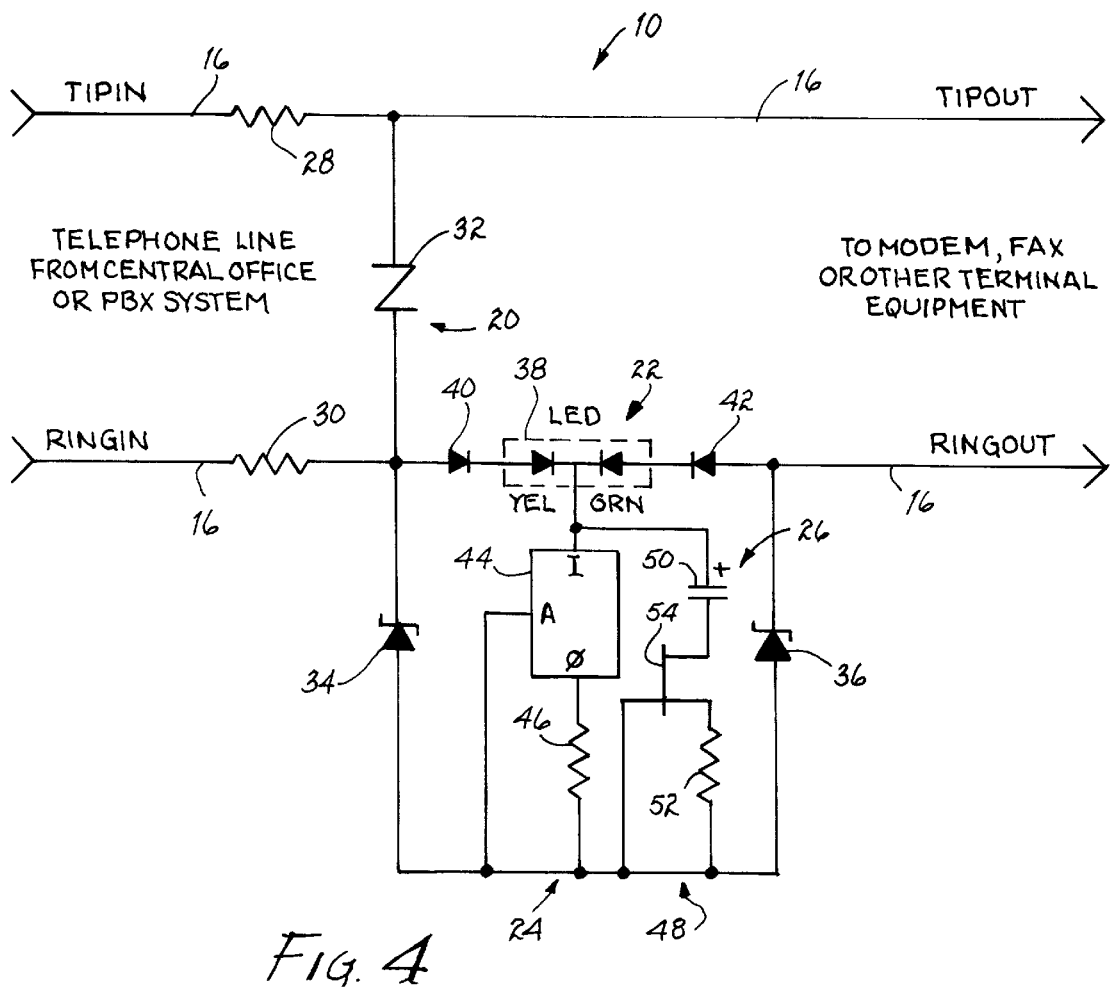
FIG. 4 shows a simplified electrical schematic of the telephone loop-current regulator depicted in FIG. 3.

Referring to FIGS. 3 and 4, wherein like numerals and symbols represent like elements, a loop-current regulator 10 (hereinafter regulator 10) is shown. As shown more clearly in FIG. 3, the regulator 10 is positioned between the telephone switching equipment 12 and a piece of terminal telephone equipment 14 such as a telephone, computer modem, answering machine, or facsimile machine. The regulator 10 plugs into any standard telephone jack ahead of the piece of terminal telephone equipment 14. The regulator 10 is designed to protect the terminal telephone equipment 14 from high telephone line loop-current and the damage or dysfunction that the heat produced from excess power may cause to the terminal telephone equipment 14 coupled to the telephone lines 16.

The regulator 10 is comprised of four main components: a surge protection unit 20, a bridge rectifier unit 22, a current regulator section 24, and a signal network section 26.

The surge protection unit 20 only protects the terminal telephone equipment 14 coupled to the regulator 10 from line-to-line surges. This is due to the fact that the surge protection unit 20 has no reference to ground. The surge protection unit 20 is comprised of a pair of resistors 28 and 30 and a surge protector 32. The pair of resistors 28 and 30 each have one terminal which is coupled to the telephone lines 16. The second terminal of each resistor 28 and 30 is coupled to the surge protector 32. The surge protector 32 can be a varistor, sidactor, or other surge protection component.

The bridge rectifier unit 22 is coupled to the surge protection unit 20. The bridge rectifier unit 22 is designed to allow current to pass in only a single direction through the current regulator section 24 and the signal network section 26 regardless of the polarity of the telephone lines 16. At any given time, the line-polarity may be reversed because the telephone lines 16 are incorrectly connected or when the telephone company provides "battery reversal" to indicate that the party at the other end of the connection is in an off-hook condition.

The bridge rectifier unit 22 uses a pair of zener diodes 34 and 36 which are coupled across the current regulator section 24 and the signal network section 26 respectively. The zener diodes 34 and 36 are used to protect the current regulator section 24 and the signal network section 26 by limiting the maximum voltage across both circuits. The zener diodes 34 and 36 are themselves protected by the minimum resistance of the telephone lines 16 (i.e., loop resistance), and the maximum voltage presented by the telephone company (i.e., battery voltage) which are both limited by the rules set forth in the FCC, Part 68 Regulations.

The bridge rectifier unit 22 uses a dual Light Emitting Diode (LED) 38 to indicate the actual polarity of the telephone line 16 at any given time. A pair of diodes 40 and 42 are coupled to each end of the dual LED 38. The cathode terminals of each diode 40 and 42 are individually coupled to separate and opposite ends of the dual LED 38. The anode terminals of diodes 40 and 42 are individually coupled to separate cathode terminals of zener diodes 34 and 36 respectively. The diodes 40 and 42 serve to increase the effective breakdown voltage of the dual LED 38. This protects the dual LED 38 from reverse conduction. In the preferred embodiment of the present invention, the diodes 40 and 42 are selected to have reverse breakdown voltage ratings in excess of the zener voltage of zener diodes 34 and 36.

The current regulator 24 is coupled to the bridge rectifier unit 22. The current regulator 24 protects the telephone terminal equipment 14 from excess power. The current regulator 24 does this by limiting the amount of direct current (DC) which passes through to the terminal telephone equipment 14 when the terminal telephone equipment 14 is in an off-hook condition. The current regulator 24 also limits the amount of AC ring current which passes through to the terminal telephone equipment 14 when the telephone line 16 is ringing. These currents may generate excess power which may cause additional heat in the terminal telephone equipment 14. This additional heat build up may damage the terminal telephone equipment 14. The current regulator 24 allows both the telephone switching equipment 12 and terminal telephone equipment 14 to work effectively with a minimum amount of loop-current. This minimizes heat dissipation in the terminal telephone equipment 14. The current regulator 24 automatically adjusts to any changes in telephone line 16 length or resistance, terminal telephone equipment 14 used, temperature, and other environmental changes.

The current regulator 24 is comprised of a voltage regulator 44 and a resistor 46. The voltage regulator 44 is used for maintaining a predetermined voltage level. Any voltage regulator 44 such as a LM317 from NATIONAL SEMI-CONDUCTOR may be used. The resistor 46 is coupled to the voltage regulator 44 and is used to set the maximum amount of current. In the preferred embodiment of the present invention, the current regulator 24 regulates the current to approximately 25+/−1 milliamps which is suitable for proper operation of both the telephone switching equipment 12 and the terminal telephone equipment 14.

The signal network section 26 is coupled to both the bridge rectifier unit 22 and the current regulator 24. The signal network section 26 is used to allow AC signals to pass by the current regulator 24 while minimizing attenuation of the AC signals. The signal network section 26 also limits a capacitor charging current in order to avoid the unlimited current surge of charging a capacitor when the terminal telephone equipment 14 first goes off-hook. This allows the regulator 10 to pass FCC Regulations, Part 68, Section 68.314(c)(2).

The signal network section 26 has a current limiting circuit 48 which limits the charging current of the capacitor 50. The current limiting circuit 48 is also optimized to attenuate the AC signals as little as possible. This requires minimizing dynamic impedance which is the opposite of what most current limiting circuits are designed to accomplish.

The current limiting circuit 48 is comprised of a transistor 54 and a resistor 52. The resistor 52 conducts current until the voltage across the resistor 52 and the gate to source of transistor 54 approaches the pinch-off voltage of the transistor 54. The maximum current is limited by the maximum gate to source off voltage (i.e., $V_{gs(off)}$).

After the capacitor 50 is charged, the transistor 54 and the resistor 52 must present a minimum impedance to allow AC signals to pass through the capacitor 50 with a minimum of attenuation. This is accomplished by using a depletion mode Field-Effect Transistor (FET) with a minimum pinch-off voltage and a minimum on-resistance. The smaller the pinch-off voltage of the transistor 54, the smaller the value of the resistor 52 needs to be. The sum of the on-resistance of the transistor 54 plus the resistance value of the resistor 52 represents the "dynamic impedance". While most current limiting circuits are designed to maximize "dynamic impedance", this design strives to minimize dynamic impedance and thereby minimize AC signal attenuation. This allows the regulator 10 to pass FCC Regulations, Part 68, Section 68.314(c) (2).

As stated above, the regulator 10 complies with FCC Regulations, Part 68, Section 68.314(c)(2). Compliance is accomplished by allowing the capacitor 50 to charge using less than one-third (⅓) of the current regulator current. When the capacitor 50 is fully charged, the charging current drops to essentially zero (0), thereby decreasing the total loop-current by less than twenty-five percent (25%) of its maximum total current. With a minimum current regulator current of 24 milliamps, the capacitor charging current is limited to a maximum of eight (8) milliamps.

It should further be noted that the current regulator 24 and the signal network section 26 function together to limit the current through the dual LED 38. This protects the dual LED 38 from damage in any situation.

While the invention has been particularly shown and described with reference to preferred embodiments thereof, it will be understood by those skilled in the art that the foregoing and other changes in form, and details may be made therein without departing from the spirit and scope of the invention.

I claim:

1. A loop-current regulator system for protecting terminal telephone equipment coupled to telephone lines from high telephone line loop-current comprising, in combination:
   a current regulator for protecting said terminal telephone equipment from excess power generated by current signals which pass through said telephone lines to said terminal telephone equipment;
   signal network circuit coupled to said current regulator for providing an alternating current (AC) path for AC signals to pass by said current regulator while minimizing attenuation of said AC signals;
   bridge rectifier circuit coupled to said current regulator, said signal network circuit, and said telephone lines for allowing said current signals to pass in only a single direction through said current regulator and said signal network circuit regardless of polarity of said telephone lines wherein said bridge rectifier circuit comprises a pair of zener diodes coupled to said telephone lines, said current regulator, and said signal network circuit for limiting a maximum voltage across said current regulator and said signal network circuit; and
   surge protection circuit coupled to said bridge rectifier circuit and to said telephone lines for protecting said terminal telephone equipment form line-to-line surges.

2. A loop-current regulator system for protecting terminal telephone equipment in accordance with claim 1 wherein said current regulator protects said terminal telephone equipment coupled to said loop-current regulator system by limiting direct current (DC) signals which passes through to said terminal telephone equipment when said terminal telephone equipment is in an off-hook condition and by limiting AC ring signals which are passed to said terminal telephone equipment when said telephone line is ringing.

3. A loop-current regulator system for protecting terminal telephone equipment in accordance with claim 2 wherein said current regulator comprises:
   a regulator; and
   a resistor coupled to said regulator for setting a maximum current level.

4. A loop-current regulator system for protecting terminal telephone equipment in accordance with claim 3 wherein said resistor sets said maximum current level at approximately twenty-five (25) milliamps.

5. A loop-current regulator system for protecting terminal telephone equipment in accordance with claim 1 wherein said signal network further limits a charging current to prevent current surges when said terminal telephone equipment is in an off-hook condition.

6. A loop-current regulator system for protecting terminal telephone equipment in accordance with claim 5 wherein said signal network provides said AC path for at least one of audio signals, Dual Tone Multiple Frequencies (DTMF), and voice signals.

7. A loop-current regulator system for protecting terminal telephone equipment in accordance with claim 5 wherein said signal network comprises:
   a capacitor coupled to said current regulator which allows said AC signals to pass through while minimizing attenuation of said AC signals; and
   current limiting circuit coupled to said capacitor for limiting said charging current to said capacitor.

8. A loop-current regulator system for protecting terminal telephone equipment in accordance with claim 7 wherein said current limiting circuit comprises:
   a transistor having drain, gate, and source terminals, wherein said drain terminal is coupled to said capacitor, and said gate terminal is coupled to said current regulator; and
   a resistor having a first terminal coupled to said source terminal of said transistor and a second terminal coupled to said gate terminal of said transistor wherein said resistor conducts until a voltage level across said resistor approaches a pinch-off voltage of said transistor.

9. A loop-current regulator system for protecting terminal telephone equipment in accordance with claim 8 wherein said transistor and said resistor has a minimum dynamic impedance to allow said AC signals to pass through said capacitor while minimizing attenuation of said AC signals.

10. A loop-current regulator system for protecting terminal telephone equipment in accordance with claim 8 wherein said transistor is a depletion mode Field-Effect Transistor (FET).

11. A loop-current regulator system for protecting terminal telephone equipment in accordance with claim 1 wherein said bridge rectifier circuit further comprises:
    a dual Light Emitting Diode (LED) coupled to said telephone lines for indicating line polarity of said telephone lines; and
    a pair of diodes coupled to opposite ends of said dual LED for increasing an effective breakdown voltage of said dual LED.

12. A loop-current regulator system for protecting terminal telephone equipment in accordance with claim 1 wherein said surge protection circuit comprises:
    a surge protector coupled to said telephone lines; and
    a pair of resistors wherein each resistor has one end directly connected to said surge protector and a second end directly connected to said telephone lines.

13. A loop-current regulator system for protecting terminal telephone equipment coupled to telephone lines from high telephone line loop-current comprising, in combination:
    a current regulator for protecting said terminal telephone equipment from excess power generated by current signals which pass through said telephone lines to said terminal telephone equipment by limiting direct current (DC) signals which passes through to said terminal telephone equipment when said terminal telephone equipment is in an off-hook condition and by limiting AC ring signals which are passed to said terminal telephone equipment when said telephone line is ringing;
    signal network circuit coupled to said current regulator for providing an alternating current (AC) path for AC signals to pass by said current regulator while minimizing attenuation of said AC signals and for limiting a charging current to prevent current surges when said terminal telephone equipment is in said off-hook condition;

bridge rectifier circuit coupled to said current regulator, said signal network circuit, and said telephone lines for allowing said current signals to pass in only a single direction through said current regulator and said signal network circuit regardless of polarity of said telephone lines, said bridge rectifier circuit comprising a pair of zener diodes coupled to said telephone lines, said current regulator, and said signal network circuit for limiting a maximum voltage across said current regulator and said signal network circuit; and surge protection circuit coupled to said bridge rectifier circuit and to said telephone lines for protecting said terminal telephone equipment form line-to-line surges.

14. A loop-current regulator system for protecting terminal telephone equipment in accordance with claim 13 wherein said current regulator comprises:

a voltage regulator for maintaining a predetermined voltage level; and a resistor coupled to said voltage regulator for setting a maximum current level.

15. A loop-current regulator system for protecting terminal telephone equipment in accordance with claim 14 wherein said resistor sets said maximum current level at approximately twenty-five (25) milliamps.

16. A loop-current regulator system for protecting terminal telephone equipment in accordance with claim 13 wherein said signal network comprises:

a capacitor coupled to said current regulator which allows said AC signals to pass through while minimizing attenuation of said AC signals; and current limiting circuit coupled to said capacitor for limiting said charging current to said capacitor, said current limiting circuit comprising:

a transistor having drain, gate, and source terminals, wherein said drain terminal is coupled to said capacitor, and said gate terminal is coupled to said current regulator; and a resistor having a first terminal coupled to said source terminal of said transistor and a second terminal coupled to said gate terminal of said transistor wherein said resistor conducts until a voltage level across said resistor approaches a pinch-off voltage of said transistor.

17. A loop-current regulator system for protecting terminal telephone equipment in accordance with claim 16 wherein said transistor is a depletion mode Field-Effect Transistor (FET).

18. A loop-current regulator system for protecting terminal telephone equipment in accordance with claim 13 wherein said bridge rectifier circuit further comprises:

a dual Light Emitting Diode (LED) coupled to said telephone lines for indicating line polarity of said telephone lines; and a pair of diodes coupled to opposite ends of said dual LED for increasing an effective breakdown voltage of said dual LED.

19. A loop-current regulator system for protecting terminal telephone equipment in accordance with claim 13 wherein said surge protection circuit:

a surge protector coupled to said telephone lines; and a pair of resistors wherein each resistor has one end coupled to said surge protector and a second end coupled to said telephone lines.

* * * * *